US012323328B2

(12) United States Patent
Cohen

(10) Patent No.: US 12,323,328 B2
(45) Date of Patent: Jun. 3, 2025

(54) HASH-TABLE LOOKUP WITH CONTROLLED LATENCY

(71) Applicant: Intel Corporation, Santa Clara, CA (US)

(72) Inventor: Elazar Cohen, Haifa (IL)

(73) Assignee: Intel Corporation, Santa Clara, CA (US)

(*) Notice: Subject to any disclaimer, the term of this patent is extended or adjusted under 35 U.S.C. 154(b) by 1288 days.

(21) Appl. No.: 16/727,685

(22) Filed: Dec. 26, 2019

(65) Prior Publication Data

US 2020/0136971 A1 Apr. 30, 2020

Related U.S. Application Data

(60) Provisional application No. 62/858,956, filed on Jun. 7, 2019.

(51) Int. Cl.
H04L 9/08 (2006.01)
H04L 9/06 (2006.01)
H04L 45/745 (2022.01)
H04L 45/7453 (2022.01)

(52) U.S. Cl.
CPC ........ H04L 45/7453 (2013.01); H04L 9/0643 (2013.01); H04L 9/0833 (2013.01); H04L 45/74591 (2022.05)

(58) Field of Classification Search
CPC . H04L 9/0833; H04L 9/0643; H04L 45/7453; H04L 45/74591
USPC ........................................................ 713/189
See application file for complete search history.

(56) References Cited

U.S. PATENT DOCUMENTS

| 9,171,030 | B1* | 10/2015 | Arad | H04L 45/74 |
| 2003/0210689 | A1* | 11/2003 | Davis | H04L 45/745 |
| | | | | 711/216 |
| 2005/0141519 | A1* | 6/2005 | Rajgopal | H04L 45/745 |
| | | | | 370/363 |
| 2008/0028140 | A1* | 1/2008 | Davis | H04L 45/7453 |
| | | | | 711/108 |
| 2008/0034115 | A1* | 2/2008 | Chu | G06F 16/2255 |
| | | | | 709/239 |
| 2009/0041017 | A1* | 2/2009 | Luk | G06F 16/9014 |
| | | | | 370/392 |
| 2009/0097654 | A1* | 4/2009 | Blake | G06F 16/9014 |
| | | | | 380/277 |
| 2013/0311492 | A1* | 11/2013 | Calvignac | G06F 16/9014 |
| | | | | 707/756 |

(Continued)

OTHER PUBLICATIONS

P. Reviriego, Energy Efficient Exact Matching for Flow Identification with Cuckoo Affinity Hashing, IEEE (Year: 2014).*

(Continued)

Primary Examiner — Samson B Lemma
(74) Attorney, Agent, or Firm — Compass IP Law PC

(57) ABSTRACT

Examples described herein relate to key-value lookups. A first index is calculated based on a first hash function and a received key. A first hash table including entries associated with a first hash calculation on a key is accessed. A collision hint table is accessed to identify any other hash table to search. If the collision hint table indicates any other table to search, the first hash table and the any other hash table are searched to identify an entry associated with an index that matches the first index.

10 Claims, 11 Drawing Sheets

(56) References Cited

U.S. PATENT DOCUMENTS

| | | | |
|---|---|---|---|
| 2014/0301394 A1* | 10/2014 | Arad | G06F 16/245 370/392 |
| 2016/0269290 A1* | 9/2016 | Chu | H04L 45/748 |
| 2017/0242618 A1* | 8/2017 | Tran | G06F 3/0683 |
| 2018/0205654 A1* | 7/2018 | Hasani | H04L 45/7453 |

OTHER PUBLICATIONS

Socrates Demetriades, An Efficient Hardware-based Multi-hash Scheme for High Speed IP Lookup, 16th IEEE Symposium (Year: 2008).*

Salvatore Pontarelli, "EMOMA: Exact Match in One Memory Access" (Year: 2017).*

DPDK, Data Plane Development Kit, "Packet Framework", Programmer's Guide, Release 17.02.1, downloaded from https://doc.dpdk.org/guides-17.02/prog_guide/packet_framework.html Jul. 24, 2020, 20 pages.

Pagh, et al., "Cuckoo Hashing", BRICS Department of Computer Science, University of Aarhus, Denmark, Aug. 2001, 24 pages.

Wikipedia, "Hash Table", downloaded from https://en.wikipedia.org/wiki/Hash_table, Jul. 24, 2020, 20 pages.

* cited by examiner

HASH-TABLE LOOKUP WITH CONTROLLED LATENCY

RELATED APPLICATION

The present application claims the benefit of a priority date of U.S. provisional patent application Ser. No. 62/858,956, filed Jun. 7, 2019, the entire disclosure of which is incorporated herein by reference.

BACKGROUND

Databases, tables, trees, and other data structures are used to provide single variable or multiple-variable associations among data and can be used for data lookup operations. A variety of organizations can be used in connection with grouping the data. Data lookup operations take place in a variety of contexts such as cloud computing, cloud storage, packet routing, and so forth. An important performance criteria in data lookup system design is the reduction of the upper bound of the time from when a request for data is received to a time in which a response is provided.

A Key-Value (KV) storage device or networking system maps arbitrary-length key-strings to arbitrary-length value-strings. The key is typically mapped to a value-location (e.g., a disk address and length pair) using a search structure such as a Log-structured-merge (LSM) tree, a B-tree, or through a hash table. The search structure is generically called an address translation table (ATL).

DETAILED DESCRIPTION

A hash-table is an associative array that maps a key to a value. Access of the hash-table is based on generating an index into the table using a hash function that is operated on the key. Each entry in that table is called a bucket. A hash function applied to different keys might lead to the same bucket, a so called "collision." A hash-table is a commonly used search algorithm in packet processing hardware accelerators.

A key challenge with use of a hash-table, accelerated using hardware, is latency. More specifically, maintaining predictable, bounded low latency can improve performance of hash-table lookups. Latency is a direct derivative of the number of memory accesses required per lookup. In other words, the higher the number of memory accesses, the higher the latency. Moreover, fixed, predictable latency is crucial for communication protocols and is very important for workload balancing and timing sensitive pipelines. Traditional hardware-based hash-table lookup solutions suffer from non-fixed and unbounded latency.

Figure 1:
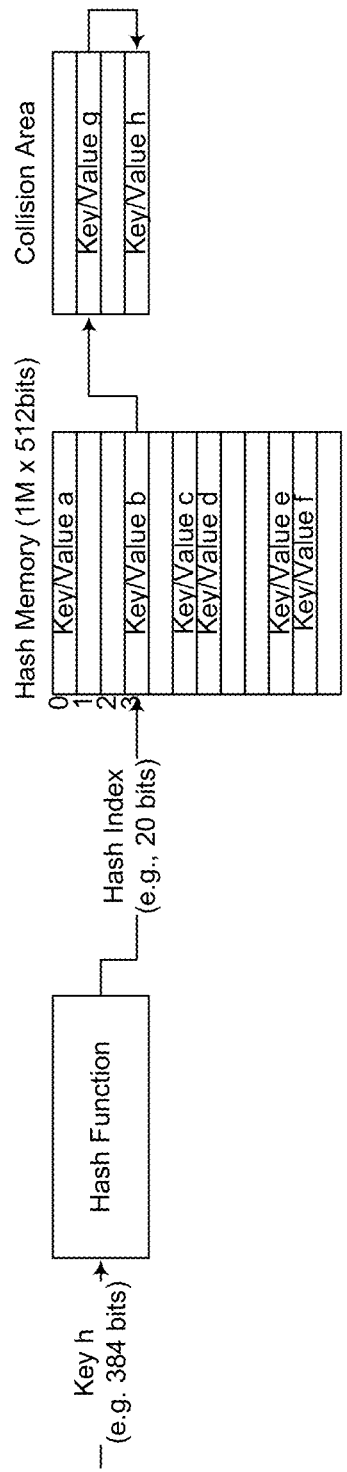
FIG. 1 depicts an example of key-value look up.

FIG. 1 depicts an example of key-value look-up. A key h (e.g., 384 bits) is processed using a hash function to generate a hash index (e.g., 20 bits). The hash index is used to look-up a value in a hash memory, a so called key/value pair. However, hashing of the lookup key can create collisions between different keys such that multiple different keys map to the same index and entry in a look-up table. In the event of a collision, successive memory accesses into a table are made to find the matched key among the collision set.

A common hardware implementation for collision resolution is known as link list separate chaining. Each entry is a linked list of all key-value pairs that belongs to the same bucket. The head of the list is pointed by the hash index. The rest of the entries are located in a separate memory area (e.g., collision area). In the case of a collision, a linked list is traversed to search for matching key-values. However, a link list size is not bounded, which can lead to unpredictable read time in case of collisions. Worst case latency can be considered the latency of a single memory lookup, multiplied by the maximal length of the link list. In a case where packets are to be transmitted or processed in order, large buffers are needed for packets to store packets during the lookup process. These buffers shall compensate for worst case latency. In addition, latency of packet processing using key-value lookups can be non-deterministic or excessive.

In the example of FIG. 1, 8 keys are mapped into 6 hash indexes. If keys b, g and h are mapped to the same index 3, then a collision occurs for any of keys b, g and h. To resolve a collision, key b is linked to key g, which is linked to key h. Access to key h requires 3 cycles of memory reads. For larger numbers of keys mapped to the same index, the number of memory reads can grow.

Collision resolution involves multiple cycles of memory reads, which can cause latencies in key-value lookups. The ratio between the number of entries (n) and number of buckets (k) defines a load factor. A low value of a load factor assures a low probability of a collision, but dictates large unused memory area. Known literature describes methods in which a hash table consists of pointers and not full key-value pairs, thus reducing memory footprint, but indirect addressing is used, which can introduce double latency and bandwidth overhead, which is not desired for per packet lookup. Existing solutions are designed to tolerate a maximum of 3 or even 4 memory accesses for each lookup before latency is unacceptable.

For networking devices, buffer sizes and processing engines are used along the pipeline to handle packet build up at least due to latency caused by hash-table lookups. Because networking traffic is an ordered stream of packets, processing a key-value look up for one packet where collision occurs can have a long latency impacts the latency of many of its successors, and creates a traffic jam which might introduce additional delay.

Many implementations have used either very large associative arrays (e.g., content addressable memories (CAMs)), or basic hash-tables with link-list flows to resolve collision events.

Various embodiments provide for multi-hash operations, enabling reduction and bounding of latency with minor incremental increase of lookup bandwidth. Multi-hash operations can reduce latency practically to 1 memory access time, with the incremental investment of approximately 10% in memory access bandwidth and used of a small sized content associative memory (CAM). Various embodiments potentially use multiple hash functions in parallel and map entries into multiple hash tables. During entry add, if the primary hash table bucket is already occupied, the entry will go into the first hash table in which the bucket is vacant. In the case of a collision with another existing entry whereby an existing entry includes an index that is the same as an index generated from a hash function, an entry for the index is added to a first available table. A hint CAM is updated to indicate which other table(s) contain colliding entries to the one in the primary or default table.

For a lookup within a collision set, instead of serial search for the matched key in a collision set, various embodiments map the collided items into different hash tables. Accordingly, in the event of a collision, only relevant tables are accessed in parallel and matching from a table lookup can conclude within a latency of one additional memory access. The use of multi hash flow enables a wide range of hardware solutions, which all share the ability to create an upper bound of the latency of the lookup (predictable latency), usually to much lower number than the average latency of existing solutions. Various embodiments also provide an ability to tune performance versus cost tradeoffs, unlike most of the known solutions which are software oriented algorithms.

Various embodiments provide a streamlined processing of packets in a pipeline with no iterative access to memory, and very rare exception cases. When attempting to add a new entry (e.g., key-value pair corresponding to an index generated from a hash of a key) to a table but the primary (default) and all secondary tables are full (e.g., have no free entry), such that a new entry cannot be added to a table. In the case of such exception, handling is passed to software (e.g., driver for a network interface) as a condition that leads to cleaning up the primary or secondary tables to evict one or more entries to free entry space to add a new entry. As multi-hash exception probability is very low, it enables ignoring the performance impact of these exceptions when designing the look up pipeline. For addition or removal of entries, actions can be performed as atomic operations. Unlike link list management, which requires modification of previous and/or next item in the list for adding a new item, for atomic operations, once an entry is written to the table, the entry is valid and active. Here again, the flow enables on the spot execution, rather than iterative modification.

Figure 2:
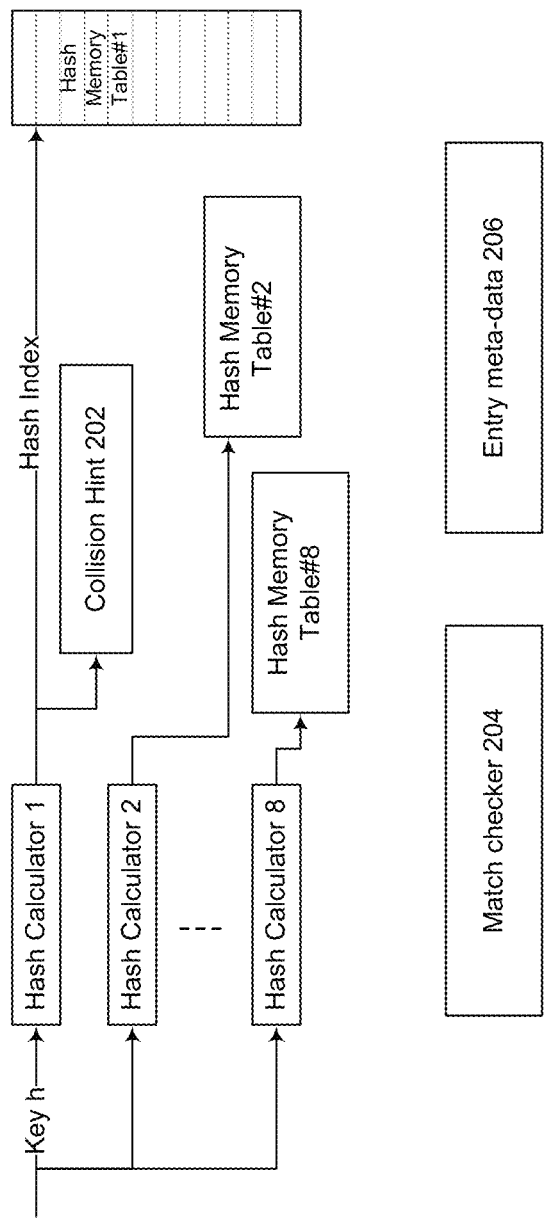
FIG. 2 depicts an example of a system.

FIG. 2 depicts an example of a system. The system includes M hash-table potential lookups running in parallel and an optional on-die associative memory (CAM) for capturing collision hints. A key h can be received by the system (for example, the key can be 384 bits or other size). Hash Calculator 1 calculation is performed on the key and denoted hash1(key) and a lookup of an entry in Hash Memory Table 1 occurs using the hash index resulting from hash1(key). Hash Calculator 1 can be any operation such as one or a combination of SHA256, MD5, Toeplitz, checksum, or CRC32 using a same or different portion of a key. A different hash calculation can be generated for Hash Calculator 1 to Hash Calculator 8 using different hash functions using the same or different key or using the same hash function but using or selecting a different private key for the hash engine. Hash Calculator 1 to Hash Calculator 8 can be performed by a central processing unit (CPU), core, graphics processing unit (GPU), field programmable gate array (FPGA), or application specific integrated circuit (ASIC).

For adding a new key-value pair into Hash Memory Table #1, if an entry in the Hash Memory Table #1 is vacant or Hash Memory Table #1 has memory space to add an entry, the new entry (e.g., key-value) is added in the Hash Memory Table #1. Collision hint 202 (e.g., hint CAM) indicates no collision for an index resulting from hash1(key).

In the case of a collision with another existing entry whereby an existing entry in Hash Memory Table #1 includes an index that is the same as hash1 (key), an entry for hash2 (key) is added to a first available table (e.g., Hash Memory Table #2), where hash2 is different from hash1 or hash2 generates a different index than hash1 for the same key or input. In addition or alternatively, in some examples, hash 2 can operate on different portions of the key than hash1 and use the same or different hash function. Collision hint 202 is updated to indicate which other table(s) to inspect other than Hash Memory Table #1. In this example, collision hint 202 is updated to identify Hash Memory Table #2 (hash memory 2). A next time an index is calculated that matches hash1 (key) for any key, collision hint 202 identifies Hash Memory Table #2 (hash memory 2) as another table to search for an entry. For a subsequent access using a same index resulting from hash1 (key), when there is a unique match based on hash1 (key) in Hash Memory Table #1, the entry is retrieved from hash memory 1 and used to access a key-value pair. For a unique match based on hash2 (key) in hash memory 2, the entry is retrieved and used to access a key-value pair. If the key in the key-value pair matches the provided key, the value is provided to the requester.

In the case of a collision with another existing entry in hash memory 1 where an existing entry includes an index that is the same as hash1(key), an entry for hash2(key) is attempted to be added to a first available table (e.g., hash memory 2). However, if hash memory 2 also has an existing entry that includes an index that is the same as hash2(key), where hash2 is a different function than hash1, an entry is added to a first available table (e.g., Hash Memory Table #3) based on hash3(key), where hash1, hash2, and hash3 are different hash functions or produce different indexes for a hash calculation on the same key. Collision hint 202 is updated to indicate which other table(s) to inspect other than Hash Memory Table #1. In this example, collision hint 202 is updated to identify tables 2 and 3.

For a subsequent access using a same index resulting from hash1(key), when there is a unique match based on hash1 (key) in hash memory 1, the entry is retrieved from hash memory 1 and used to access a key-value pair. For a unique match based on hash2(key) in hash memory 2, the entry is retrieved and used to access a key-value pair. For a unique match based on hash3(key) in hash memory 3, the entry is retrieved and used to access a key-value pair. If the key in the key-value pair matches the provided key, the value is provided to the requester.

Various embodiments attempt to populate a new entry in the first table on which the bucket is vacant. This means that the probability of an entry to go into Hash Memory Table #2 is equal to Pcol(2). In the example of load-factor of ¼, probability is approximately 11%. Therefore, the second table size can be smaller by the same ratio. So, table size can be dramatically reduced with table index.

In some embodiments, collision hint 202 includes information about the population of Hash Memory Tables #2-8. If an entry is added to Hash Memory Table #2 or higher numbered table, the entry is captured in the collision hint 202, which associates hash index of Hash Memory Table #1 and the usage status of the bucket in Hash Memory Table #n. For example, if 3 different keys have the same hash1(key) for Table #1 (same hash1(key) value), the second entry will be put in Hash Memory Table #2 and third entry can be placed in Hash Memory Table #2 or Hash Memory Table #3, as hash2 of those keys is likely to be different. Collision hint 202 will indicate that for hash1(key), Hash Memory Table #2 and Hash Memory Table #3 are to be accessed also if the second key is in Hash Memory Table #2 and the third key is in Hash Memory Table #3.

Collision hint memory 202 can be implemented using a content addressable memory (CAM) or other memory or storage device. The memory can be on-die with the processor or accelerator that performs the hash functions. For example, on-die can refer to placement of devices on the same integrated circuit, circuit board, or chip packaging.

In this example, the average occupancy of that collision hint memory 202 is approximately Pcol(2). In case there are 0.25 million keys and 1 million buckets in Hash Memory Table #1, the CAM size shall have approximately 30,000 entries with 20 bit word size. Collision hint memory 202 can store an indication of: for a hash1(key), what hash memories tables other than Hash Memory Table #1 (e.g. default table) to look for an entry or entries. If another table or tables have an entry for hashX(key) then a corresponding hash function X (where X is one or more of values 2 to 8 in this example) on the key for the other tables identified in collision hint memory 202 can be performed and read in parallel. In some embodiments, one (1) memory read cycle is used to read collision hint memory 202 and perform other reads in one or more of tables 2-8 for respective hash functions 2-8. In other words, a search for keys in entries in the Hash Memory Table #1 and any of Hash Memory Tables #2 to #8 for a match with the received key can occur in a single memory read cycle. An entry in collision hint memory 202 can be multiples bits and store an index of hash1(key1) and include an identifier of which other table to perform a lookup of (e.g., any of tables 2-8), although other numbers of tables can be used. In many cases, there is no collision and collision hint memory 202 will not have a record for a hash1(key). A non-limiting example of an entry in collision hint 202 is provided with respect to FIG. 4.

As an example, hash1(key) is used to store an entry in Hash Memory Table #1. However, if hash1(key2) collides with hash1(key1) and Hash Memory Table #2 is full, an entry for hash1(key2) is placed in Hash Memory Table #3. An entry in collision hint memory 202 is added to indicate hash1(key1) and hash1(key2) have items in Hash Memory Table #1 and Hash Memory Table #3. So, during lookup of hash1(key1) or hash1(key2), consulting collision hint memory 202 will indicate to read Hash Memory Table #1 and Hash Memory Table #3.

If collision hint 202 shows that Hash Memory Table #2 and Hash Memory Table #3, for example, are valid (e.g., a counter value is greater than zero), then a read request for these additional hash tables will also be issued. In that case, three memory requests (for Hash Memory Table #1 to #3) will be performed in one cycle and at least partially in parallel. Multiple hash calculation operations and accesses to memory can occur in parallel within a single memory read cycle. But only one of the lookups from Hash Memory Tables #1 to #3 is expected to match. Match checker 204 can perform a comparison between a received key and a key in a retrieved entry to determine if there is a match and provide the associated value to a requester.

A difference between this type of memory request and the traditional link-list, is that in link-list the requests are serial would consume 3 times latency (e.g., 3 memory read cycles). For a match of the received key with a key in a retrieved entry in a table, the corresponding value can be provided to a requester. Only one of Hash Memory Tables #1 to #3 will have an entry with a key that matches the received key.

In some examples, Hash Calculators 1-8 can all apply different hash functions or apply the same hash function but use different private keys such that a hash of the same key by the Hash Calculators 1-8 result in different values/indexes. In addition, a hash memory table is available corresponding to each hash function. For example, Hash Calculator 2 has corresponding Hash Memory Table #2 with entries corresponding to a hash2 function on a received key, Hash Calculator 3 has corresponding Hash Memory Table #3 with entries corresponding to a hash3 function on a received key, and so forth up to Hash Calculator 8 has corresponding Hash Memory Table #8 with entries corresponding to a Hash Calculator 8 on a received key. The possibility of collisions for all of hash1(key) to hash8(key) is virtually zero. Accordingly, by finding a match in a hash memory other than Hash Memory Table #1, the entry can be used to retrieve the key-value pair and verify whether the value can be provided if the key is verified.

For addition of an entry, the lookup shall be more extensive, and shall include all hash tables, and not only those marked in collision hint 202. The reason is that collision hint 202 shows only the collision set of Hash1(subject key) (set of keys that map into same bucket in Hash Memory Table #1) and does not show other collision sets of different hash1(other key) entries. So when looking for the first available table for a specific Hash1, all tables are searched.

Removing an entry from collision hint 202 also starts with a full lookup process. The lookup process identifies the exact location of the entry. A removal process can involve also compressing the collision set to the lowest possible table index. For example, if for a specific hash1, there is an entry in Hash Memory Table #1 and in Hash Memory Table #3, and the entry in Hash Memory Table #1 is to be removed, then the entry in Hash Memory Table #3 shall be moved to Hash Memory Table #1. Various embodiments attempt to shrink the size and number of tables to contiguous table indexes and to reduce memory used or allocated for use by hash memories or tables.

The average number of entries in each table is significantly smaller than a number of entries in its predecessor table. Accordingly, the size of the hash tables and the memory size can become exponentially smaller, as the index grows. Accordingly, a number of tables can be bounded.

Many implementations have used either very large associative arrays (e.g., CAMs), or basic hash-tables with link-list flows to resolve collision events. Various embodiments bring the desired pipeline nature of associative array that can occur within a single cycle, with the hardware cost and simplicity of a hash table flow.

For example, the requester can be a virtualized execution environment that performs or requests packet processing using key-value lookup. A virtualized execution environment can include at least a virtual machine or a container. A virtual machine (VM) can be software that runs an operating system and one or more applications. A VM can be defined by specification, configuration files, virtual disk file, non-volatile random access memory (NVRAM) setting file, and the log file and is backed by the physical resources of a host computing platform. A VM can be an operating system (OS) or application environment that is installed on software, which imitates dedicated hardware. The end user has the same experience on a virtual machine as they would have on dedicated hardware. Specialized software, called a hypervisor, emulates the PC client or server's CPU, memory, hard disk, network and other hardware resources completely, enabling virtual machines to share the resources. The hypervisor can emulate multiple virtual hardware platforms that are isolated from each other, allowing virtual machines to run Linux and Windows Server operating systems on the same underlying physical host.

A container can be a software package of applications, configurations and dependencies so the applications run reliably on one computing environment to another. Containers can share an operating system installed on the server platform and run as isolated processes. A container can be a software package that contains everything the software needs to run such as system tools, libraries, and settings. Containers are not installed like traditional software programs, which allows them to be isolated from the other software and the operating system itself. The isolated nature of containers provides several benefits. First, the software in a container will run the same in different environments. For example, a container that includes PHP and MySQL can run identically on both a Linux computer and a Windows machine. Second, containers provide added security since the software will not affect the host operating system. While an installed application may alter system settings and modify resources, such as the Windows registry, a container can only modify settings within the container.

Any CPU node or virtual machine can perform packet processing using Network Function Virtualization (NFV), software-defined networking (SDN), virtualized network function (VNF), Evolved Packet Core (EPC), or 5G network slicing. Some example implementations of NFV are described in European Telecommunications Standards Institute (ETSI) specifications or Open Source NFV Management and Orchestration (MANO) from ETSI's Open Source Mano (OSM) group. VNF can include a service chain or sequence of virtualized tasks executed on generic configurable hardware such as firewalls, domain name system (DNS), caching or network address translation (NAT) and can run as virtual machines (VMs) or in virtual execution environments. VNFs can be linked together as a service chain. In some examples, EPC is a 3GPP-specified core architectures at least for Long Term Evolution (LTE) access. 5G network slicing can provide for multiplexing of virtualized and independent logical networks on the same physical network infrastructure.

Figure 3:
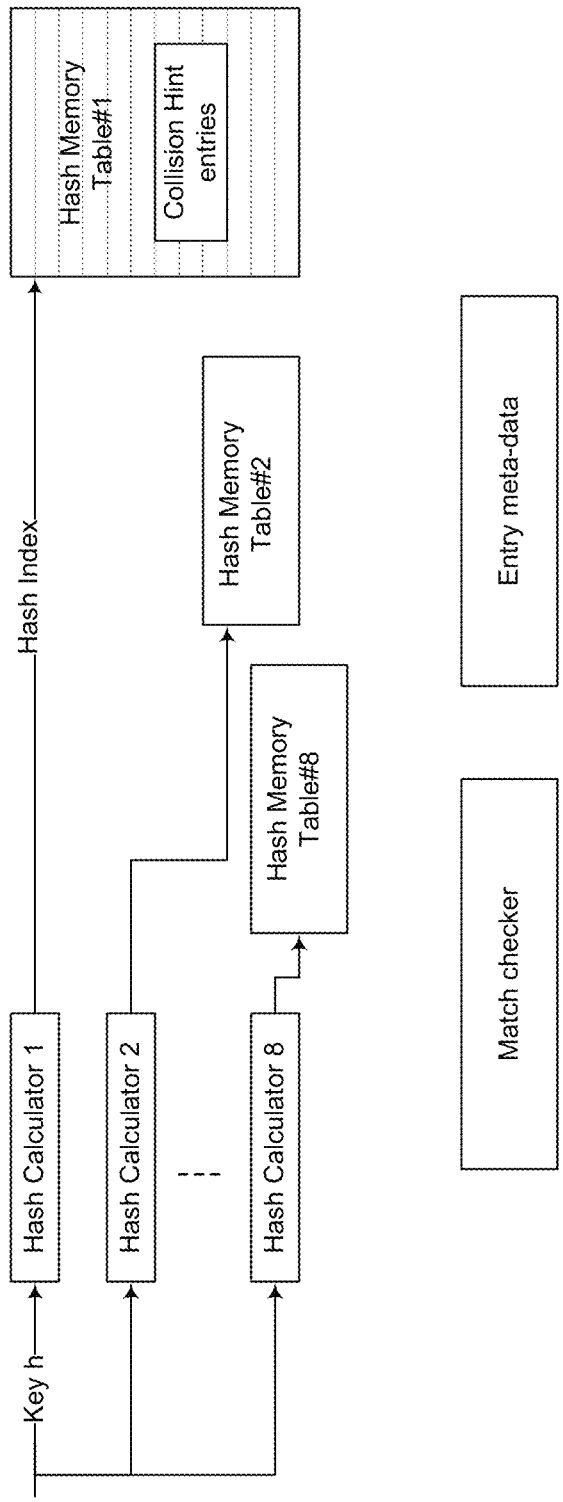
FIG. 3 depicts an example of a system.

FIG. 3 depicts an example of a system. In this example, the system can use Hash Calculators 1 to 8, however any number of hash calculators can be used such as 2, 3, 4, or more. Hash Calculator 1 can perform any hash operation such as one or a combination of: SHA256, MD5, Toeplitz, checksum, or CRC32 using a same or different portion of key h. A different hash calculation can be performed by each of Hash Calculator 1-Hash Calculator 8 for the key h. For example, different hash calculations can be generated by selecting a different private key for a hash engine In this example, the collision hint memory is not used. The information captured in the collision hint memory (collision hint entries) can reside in host memory, as part of the Hash Memory Table #1. Hash Calculator 1 performs a hash calculation on key h. Key h can be any type of information such as a portion of a packet (e.g., header value(s)) or a key for a lookup for an entry in a database. Hash Calculator 1 generates a hash index based on the key h. The hash index is provided to Hash Memory Table #1. A lookup for hash1 (key h) will start with single memory request according to the hash1 index looking up entries in Hash Memory Table #1.

In this example, collision hint information is stored inside entries of Hash Memory Table #1. If more tables are to be searched in addition to Hash Memory Table #1, then a second lookup is initiated for all relevant tables identified in the hint entries in Hash Memory Table #1. This flow saves the need for on-die CAM or memory, but makes the lookup time to be 2 read cycles of Hash Memory Table #1 and at least one other table (in case of collision) in parallel. If another table or tables have entry/entries for (key), then those table(s) are read (in parallel). In other words, a search for entries in Hash Memory Table #1 for a match of the key and the search of any other hash table for a match of the received key can occur within a duration of two memory read cycles.

For example if collision hint information looked-up for hash1(key h) identifies any of Hash Memory Table #2 to Hash Memory Table #8 for searching, then in a subsequent (e.g., next or later) read cycle, a corresponding hash function is performed on key h to generate one or more indices and a read operation is performed to identify an entry corresponding an input index in the corresponding Hash Memory Table. For example, if Hash Memory Table #2 and Hash Memory Table #3 are identified in the collision hint as storing an entry corresponding to hash1(key h), then Hash Calculator 2 and Hash Calculator 3 calculate a respective index 2 and 3 based on key h. As Hash Calculators 2 and 3 generate different index values for key h, the index 2 and index 3 are different values. The index 2 is used to perform a look-up of an entry in Hash Memory Table #2, whereas index 3 is used to perform a look-up of an entry in Hash Memory Table #3. For a match of key h with a key in a retrieved entry from either Hash Memory Table #2 or Hash Memory Table #3 (but not both), the corresponding value can be provided to a requester that provided key h.

Figure 4:
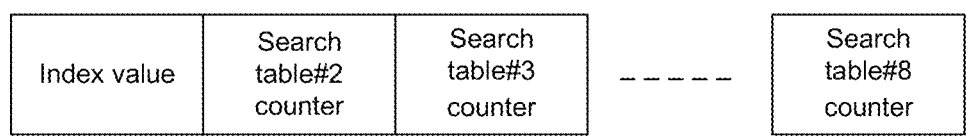
FIG. 4 depicts an example of formats of content stored in collision hint memory.

FIG. 4 depicts an example of formats of content stored in a collision hint memory or in a default hash memory table. The format of an entry can be used for the embodiments of FIGS. 2 and/or 3. An example content of an entry can include: index value, search table 2 counter, search table 3 counter, search table 4 counter . . . search table 8 (count). If a counter is zero, then the corresponding table does not store an entry corresponding to a hash on a key. If any search table counter is zero, there is no relevant entry and a search of the corresponding table is not performed. If a counter is greater than zero, then a search is to performed on another table. For any search table counter indicating a count>0, a search is performed of an entry in that table with an index that is generated using a hash calculation for that table. For example, if table2 has a search table #2 counter that is non-zero and table3 has a search table #3 counter that is non-zero, then an index is generated for table 2 using hash function 2 and another index is generated for table 3 using hash function 3 and a lookup can take place for entries in tables 2 and 3 in parallel using generated indexes.

A lookup table (e.g., Hash Memory Table #2-Hash Memory Table #8) can grow or shrink by adding or removing entries. A search table counter value can be used to track additions or removals of table. An entry addition involves writing the entry into a table, and incrementing the hint counter accordingly to indicate that a table has an additional entry that has been added. In some examples, Hash Memory Table #1 does not have a hint counter as it is always searched. However Hash Memory Table #1 can have associated meta data for use to determine which entry to evict from Hash Memory Table #1. If an entry is added to any of Hash Memory Table #2 to Hash Memory Table #8, the corresponding table counter is incremented.

Removal of an entry from a Hash Memory Table can involve decrementing a table counter. For example, if a software (e.g., driver) or administrator clears any table or removes any entry from a table, the table counter can be reduced for the corresponding Hash Memory Table. For example, one or more entries can be removed or all entries removed from a table if a network connection between a source and a receiver device ends or if a table is full and an entry is identified for removal.

In other examples, counter can be replaced with a yes/no hint (e.g., 1 bit) so that there is merely an indicator of whether to search another table. For example, search table #2=yes would indicate a Hash Calculator 2 would be performed using the received key and a search of Table #2 for the generated index is to take place. Search table #3=no would indicate a Hash Calculator 3 would not be performed using the received key and a search of Table #3 for the generated index is not to take place.

Figure 5:
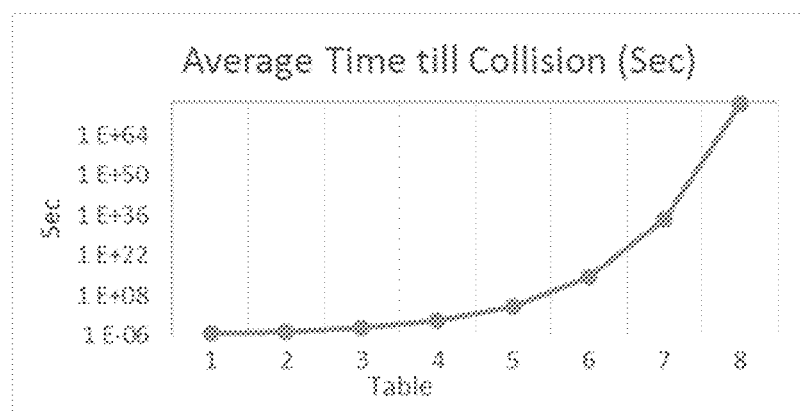
FIG. 5 shows an example for the average time it would take to reach max collision.

A maximum collision is a case in which adding a key cannot be supported as all table buckets for that specific key are occupied. FIG. 5 shows an example for the average time it would take to reach max collision. In this example, Add/Remove rate is 1 Million OPs/Sec, and the table is fully populated with load factor of ¼. The more tables that are used, the time for such event becomes longer. In that example, for 8 tables it would take $4*10^{67}$ years, which is practically never.

As the probability for such event is low enough, it might be acceptable to reject the add request (fail action) and involve processor-executed software algorithms to allow software to resolve the issue, e.g., clean-up the table to remove unused elements to free-up space for new entries. For example, least recently used (LRU) entries (e.g., entries that are accessed least over a time interval) can be identified as candidates for removal from a table. For example, as shown in FIG. 3, entry meta-data can be used to identify a number of accesses of any entry over a time period and be used to identify whether an entry is LRU.

The performance of Multi-Hash Table system are analyzed and compared to the well-known Hash-Table reference. In addition to the statistical analysis, a behavioral modeling was used to simulate the two flows. The results test case example of using embodiments for key lookup are as follows:

| | Context/Bucket ** | Time to Max-Collision * | PCIe overhead | Access cycles (probability) | Comments |
|---|---|---|---|---|---|
| BKM Hash | 0.25/1M | N/A (link list) | 112% | 3 (1%), 4 (0.05%), 5->∞ (0.003%) | link list (reference) |
| 4 TBLs MH no CAM | 0.25/1M | 144 mSec | 111% | 1 cycle (88.5%) | load factor = 4, 1 or 2 cycles |
| 6 TBLs MH no CAM | 0.25/1M | 43000 years | 111% | 2 cycles (11.5%) | |
| 8 TBLs MH w/CAM | 0.25/1M | $4*10^{32}$ years | 111% | 1 cycle | 1 cycle |

* Average time till a Max-Collision event happens assuming a rate of 1 Million Add/Remove operations per second. Upon Max-Collision, an entry cannot be populated as all Hashes collide (configuration fail).
** entry/bucket count is in Millions, and reflects the load factor. For a load factor of 4, with 8 Hash-Tables is a good optimization between total memory size, probability of Max-Collision.

Figure 6A:
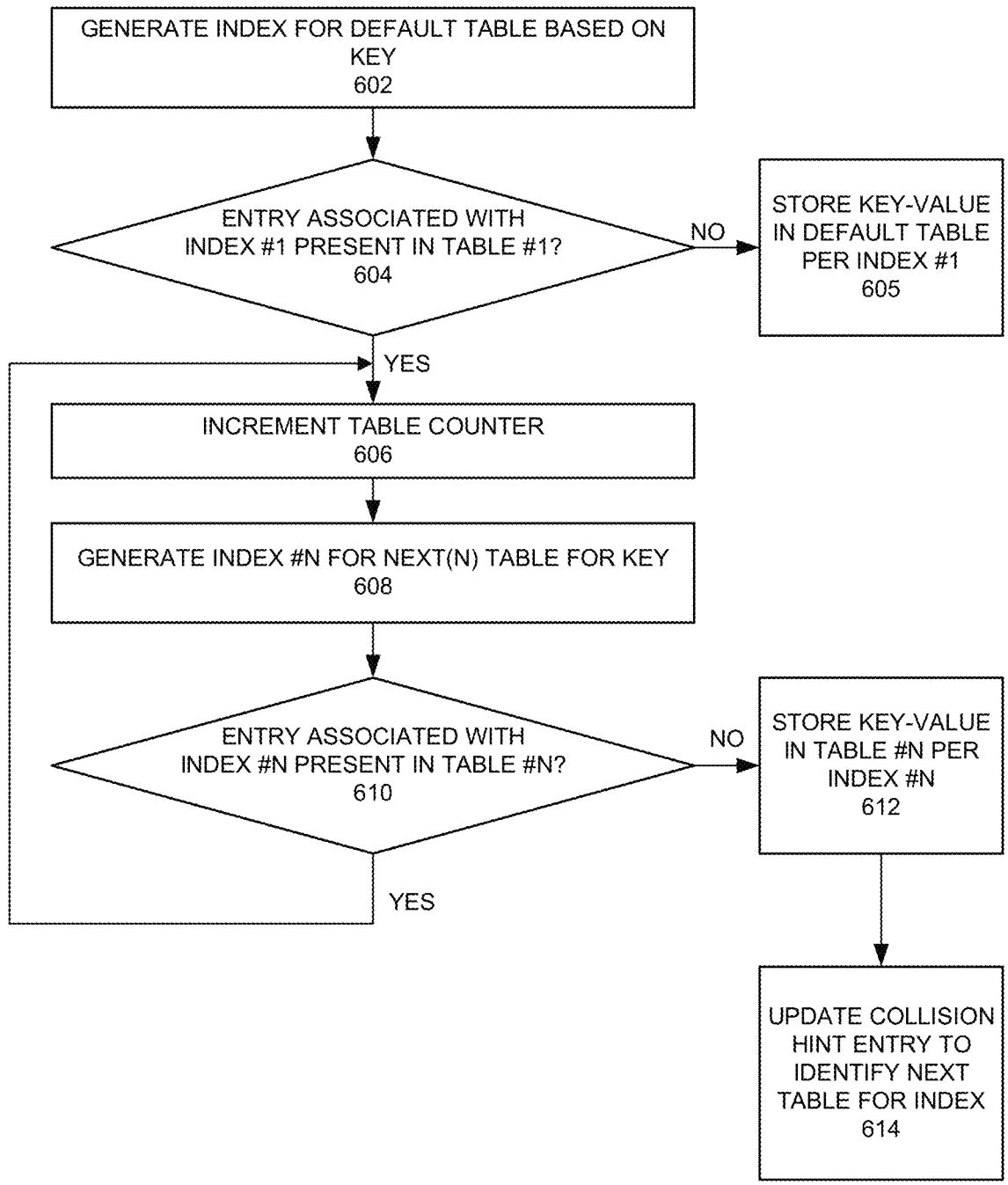
FIG. 6A depicts an example process.

FIG. 6A depicts an example process to store a key-value entry in a table for access using an index. At 602, an index is generated for a received key. An index (index #1) can be generated from a hash calculation on a key. Any type of hash function or truncation operation can be performed. At 604, a determination is made if an entry for an index is present in a table. A search can be performed for entry in a default table (e.g., table #1). If an entry with generated index is present in the default table, then the process proceeds to 606. If an entry with the generated index is not present in the default table, proceed to 605 and store an entry with index to a key-value in the default table in storage or memory.

At 606, a table counter is incremented to identify a next table. In this example, variable N is used to identify a table counter and N is incremented by 1. For example, a default table has a counter value of 1 and a next table counter is 2.

At 608, an index is generated using a hash calculation for the table counter value. In other words, for a table counter N, hash function N is performed on the key to generate an index to table N. Generating an index from hash function N can use a different hash function than used in for the default table or performing a same operation but using a different hash private key. At 610, a determination is made if an entry associated with the generated index is present in the table N. For example, table N is searched using the index generated for table N. If there is no entry associated with the index is present in the current table N, the process proceeds to 612. If any entry is associated with the index is present in the current table N, the process continues to 606 to identify a next table, table N+1.

At 612, a key-value pair is stored in the table N. A key-value pair can be a combination of a packet header portion and an action. A key can be any portion of a packet (e.g., header or payload). For example, a key can be a source IP address, destination IP address, source port number, destination port number, or protocol in use. The value can identify a packet processing operation (e.g., action), a value in a database, blockchain database, multi-media asset (image, video, website). An action can specify a set of packet processing actions to perform on the header or packet. For example, packet processing operation can refer to one or more of: sending the packet to a particular port, sending the packet to a particular next destination, modifying one or more header field values, dropping the packet, mirroring the packet to a buffer, discard the packet, flow classification, TCP termination, Address Resolution Protocol (ARP), access control list, routing service function chains (firewall, access control, decapsulation, packet processing), firewall, email server, Domain Name System (DNS), virtual private network (VPN), backup and remote file sharing, and so forth.

At 614, a collision hint table is updated to identify the next table with a free entry that stores an index to the key-value. The collision hint table can be in a separate memory or as part of an entry for Table #1. In some cases, a collision hint entry for a table to which an entry is added can be incremented to identify that another entry has been added to the table. Accordingly, the collision hint table can be used to identify which other tables to search other than a default table for a particular generated index. The generated index can be the same even for different keys.

Figure 6B:
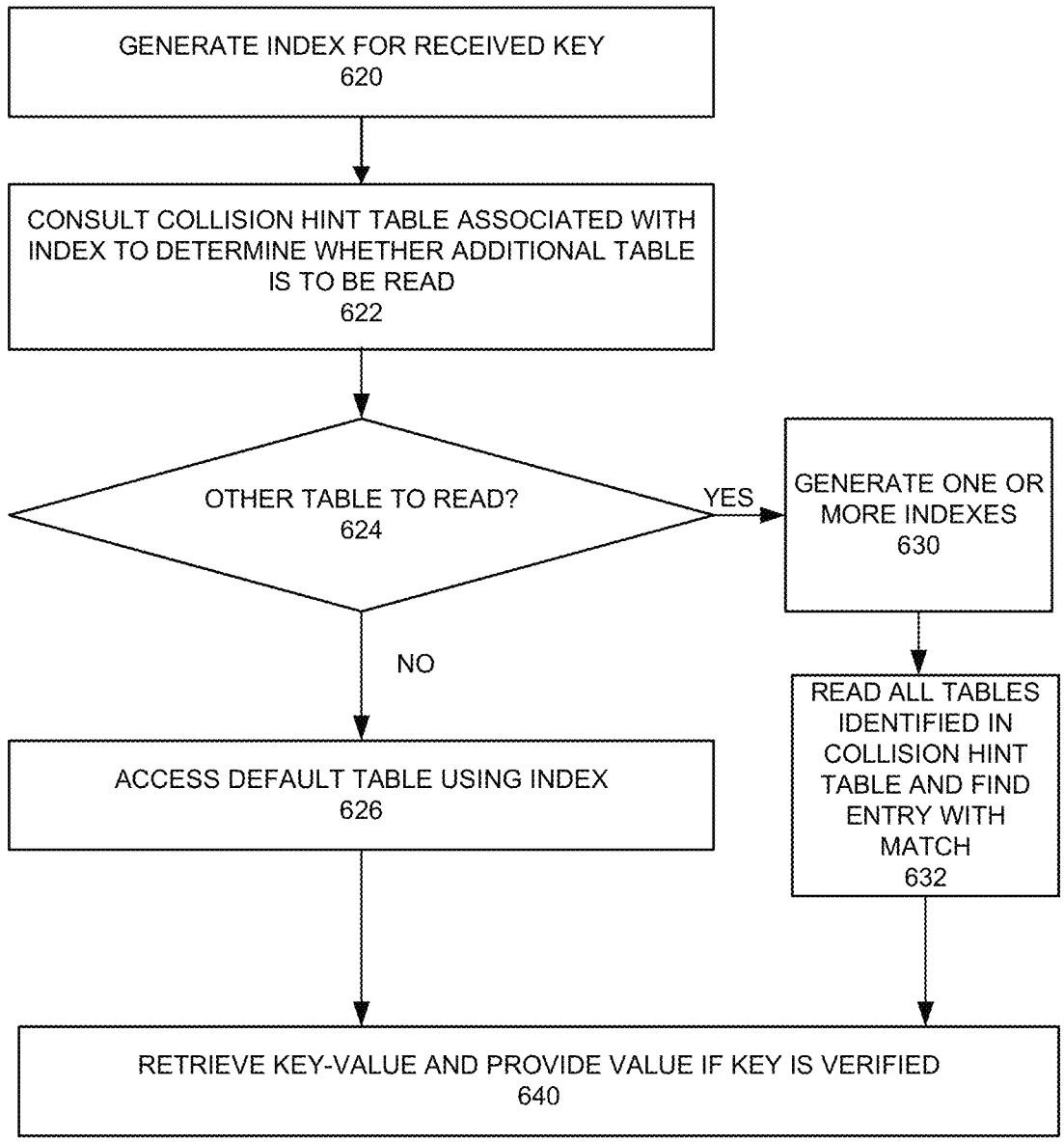
FIG. 6B depicts an example process.

FIG. 6B depicts an example process to retrieve a key-value. At 620, an index is generated for a received key. A key can be a portion of a packet (e.g., header and/or payload). For example, a key can be a source IP address, destination IP address, source port number, destination port number, or protocol in use. The index can be generated by a hash calculation. A hash calculation can be any of: SHA256, MD5, Toeplitz, checksum, or CRC32. At 622, a hint table is consulted to identify all tables to read based on the index. A collision hint table can be consulted to determine any other table than a default table stores entries associated with a hash of the received key. The collision hint table can be stored in a content addressable memory or in a default table.

At 624, a determination is made whether any other table is to be accessed or read other than the default table. If another table is to be accessed or read, then at 630, one or more other indexes are generated. The one or more other indexes can be calculated using hash functions associated with identified tables and each of the hash calculation is different from the hash calculation used in 620 and from other another, or generate different indexes for the same key. At 632, the process reads one or more other tables specified in the collision hint table to identify an entry associated with one or more other tables. One or more other tables can include the default table and/or one or more other tables than the default table. The process proceeds to 640.

If a determination is made that another table is to not to be accessed (at 624), then at 626, the default table is accessed to find an entry associated using the generated index at 620. The process proceeds to 640.

At 640, the entry is retrieved from the default table and zero or more additional tables. If the key in an entry matches the received key, a value associated with the key is provided. If a key in the retrieved key-value matches a key used to generate the index (received key), the corresponding value is provided to the requester. The value can identify a packet processing operation, a value in a database, blockchain database, multi-media asset (image, video, website). For example, packet processing operation can refer to one or more of: sending the packet to a particular port, sending the packet to a particular next destination, modifying one or more header field values, dropping the packet, mirroring the packet to a buffer, discard the packet, flow classification, TCP termination, Address Resolution Protocol (ARP), access control list, routing service function chains (firewall, access control, decapsulation, packet processing), firewall, email server, Domain Name System (DNS), virtual private network (VPN), backup and remote file sharing, and so forth. In some examples, the entry includes a pointer to memory or storage from which to retrieve a key-value corresponding to the calculated index.

Note that this example assumes that there is a match in a table between an index and an entry. If there is no match, then an indication can be provided to the requester of that no match was found.

Figure 7:
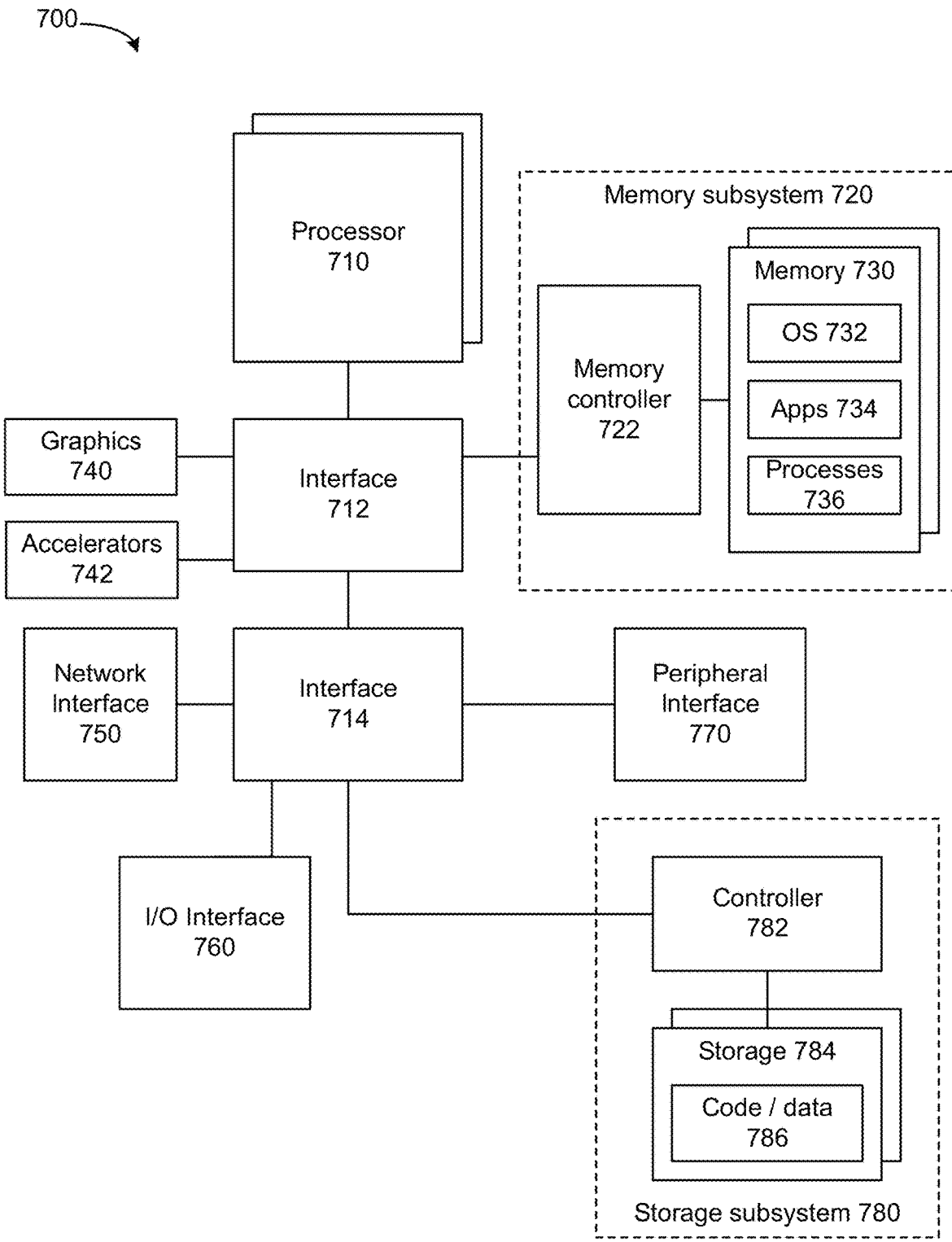
FIG. 7 depicts a system.

FIG. 7 depicts a system. The system can use embodiments described herein to perform key-value look-up operations for any type of information including packet processing match-action look up operations for received packets. System 700 includes processor 710, which provides processing, operation management, and execution of instructions for system 700. Processor 710 can include any type of microprocessor, central processing unit (CPU), graphics processing unit (GPU), processing core, or other processing hardware to provide processing for system 700, or a combination of processors. Processor 710 controls the overall operation of system 700, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 700 includes interface 712 coupled to processor 710, which can represent a higher speed interface or a high throughput interface for system components that needs higher bandwidth connections, such as memory subsystem 720 or graphics interface components 740, or accelerators 742. Interface 712 represents an interface circuit, which can be a standalone component or integrated onto a processor die. Where present, graphics interface 740 interfaces to graphics components for providing a visual display to a user of system 700. In one example, graphics interface 740 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 740 generates a display based on data stored in memory 730 or based on operations executed by processor 710 or both. In one example, graphics interface 740 generates a display based on data stored in memory 730 or based on operations executed by processor 710 or both.

Accelerators 742 can be a fixed function offload engine that can be accessed or used by a processor 710. For example, an accelerator among accelerators 742 can provide compression (DC) capability, cryptography services such as public key encryption (PKE), cipher, hash/authentication capabilities, decryption, or other capabilities or services. In some embodiments, in addition or alternatively, an accelerator among accelerators 742 provides field select controller capabilities as described herein. In some cases, accelerators 742 can be integrated into a CPU socket (e.g., a connector to a motherboard or circuit board that includes a CPU and provides an electrical interface with the CPU). For example, accelerators 742 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 742 can provide multiple neural networks, CPUs, processor cores, general purpose graphics processing units, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 720 represents the main memory of system 700 and provides storage for code to be executed by processor 710, or data values to be used in executing a routine. Memory subsystem 720 can include one or more memory devices 730 such as read-only memory (ROM), flash memory, one or more varieties of random access memory (RAM) such as DRAM, or other memory devices, or a combination of such devices. Memory 730 stores and hosts, among other things, operating system (OS) 732 to provide a software platform for execution of instructions in system 700. Additionally, applications 734 can execute on the software platform of OS 732 from memory 730. Applications 734 represent programs that have their own operational logic to perform execution of one or more functions. Processes 736 represent agents or routines that provide auxiliary functions to OS 732 or one or more applications 734 or a combination. OS 732, applications 734, and processes 736 provide software logic to provide functions for system 700. In one example, memory subsystem 720 includes memory controller 722, which is a memory controller to generate and issue commands to memory 730. It will be understood that memory controller 722 could be a physical part of processor 710 or a physical part of interface 712. For example, memory controller 722 can be an integrated memory controller, integrated onto a circuit with processor 710.

While not specifically illustrated, it will be understood that system 700 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 700 includes interface 714, which can be coupled to interface 712. In one example, interface 714 represents an interface circuit, which can include stand-alone components and integrated circuitry. In one example, multiple user interface components or peripheral components, or both, couple to interface 714. Network interface 750 provides system 700 the ability to communicate with remote devices (e.g., servers or other computing devices) over one or more networks. Network interface 750 can include an Ethernet adapter, wireless interconnection components, cellular network interconnection components, USB (universal serial bus), or other wired or wireless standards-based or proprietary interfaces. Network interface 750 can transmit data to a device that is in the same data center or rack or a remote device, which can include sending data stored in memory. Network interface 750 can receive data from a remote device, which can include storing received data into memory. Various embodiments can be used in connection with network interface 750, processor 710, and memory subsystem 720.

In one example, system 700 includes one or more input/output (I/O) interface(s) 760. I/O interface 760 can include one or more interface components through which a user interacts with system 700 (e.g., audio, alphanumeric, tactile/touch, or other interfacing). Peripheral interface 770 can include any hardware interface not specifically mentioned above. Peripherals refer generally to devices that connect dependently to system 700. A dependent connection is one where system 700 provides the software platform or hardware platform or both on which operation executes, and with which a user interacts.

In one example, system 700 includes storage subsystem 780 to store data in a nonvolatile manner. In one example, in certain system implementations, at least certain components of storage 780 can overlap with components of memory subsystem 720. Storage subsystem 780 includes storage device(s) 784, which can be or include any conventional medium for storing large amounts of data in a nonvolatile manner, such as one or more magnetic, solid state, or optical based disks, or a combination. Storage 784 holds code or instructions and data 786 in a persistent state (i.e., the value is retained despite interruption of power to system 700). Storage 784 can be generically considered to be a "memory," although memory 730 is typically the executing or operating memory to provide instructions to processor 710. Whereas storage 784 is nonvolatile, memory 730 can include volatile memory (i.e., the value or state of the data is indeterminate if power is interrupted to system 700). In one example, storage subsystem 780 includes controller 782 to interface with storage 784. In one example controller 782 is a physical part of interface 714 or processor 710 or can include circuits or logic in both processor 710 and interface 714.

A volatile memory is memory whose state (and therefore the data stored in it) is indeterminate if power is interrupted to the device. Dynamic volatile memory requires refreshing the data stored in the device to maintain state. One example of dynamic volatile memory includes DRAM (Dynamic Random Access Memory), or some variant such as Synchronous DRAM (SDRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 700. More specifically, power source typically interfaces to one or multiple power supplies in system 700 to provide power to the components of system 700. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 700 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omnipath, Compute Express Link (CXL), HyperTransport, high-speed fabric, NVLink, Advanced Microcontroller Bus Architecture (AMBA) interconnect, OpenCAPI, Gen-Z, Cache Coherent Interconnect for Accelerators (CCIX), 3GPP Long Term Evolution (LTE) (4G), 3GPP 5G, and variations thereof. Data can be copied or stored to virtualized storage nodes using a protocol such as NVMe over Fabrics (NVMe-oF) or NVMe.

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet, part of the Internet, public cloud, private cloud, or hybrid cloud. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (i.e., buses) for coupling appropriate integrated circuits (ICs) and other components mounted to the board.

Figure 8:
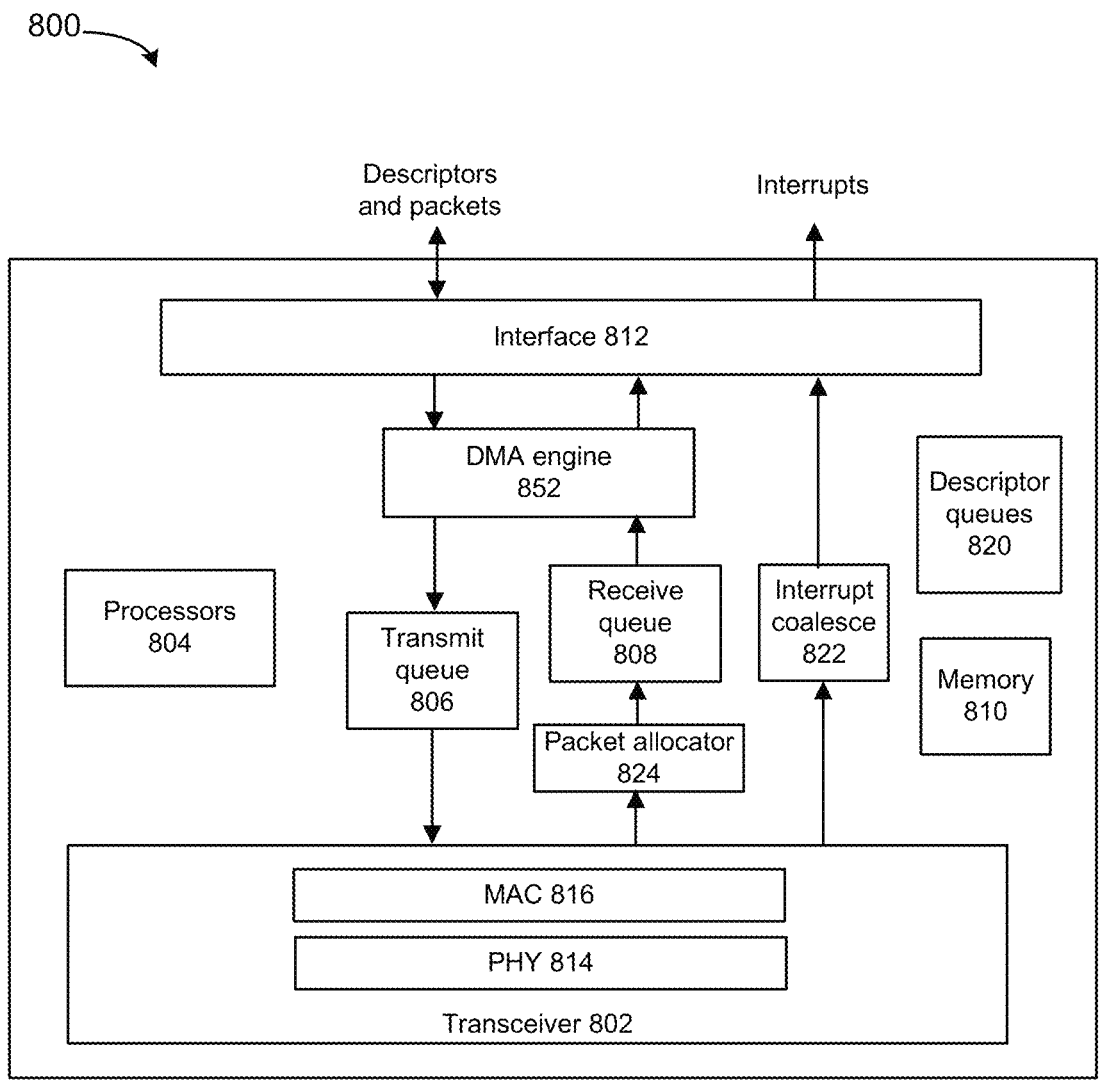
FIG. 8 depicts a network interface controller.

FIG. 8 depicts a network interface controller. Various embodiments can use the network interface or be used by the network interface to perform key-value lookup for packet routing. Network interface 800 can use transceiver 802, processors 804, transmit queue 806, receive queue 808, memory 810, and bus interface 812, and DMA engine 852. Transceiver 802 can be capable of receiving and transmitting packets in conformance with the applicable protocols such as Ethernet as described in IEEE 802.3, although other protocols may be used. Transceiver 802 can receive and transmit packets from and to a network via a network medium (not depicted). Transceiver 802 can include PHY circuitry 814 and media access control (MAC) circuitry 816. PHY circuitry 814 can include encoding and decoding circuitry (not shown) to encode and decode data packets according to applicable physical layer specifications or standards. MAC circuitry 816 can be configured to assemble data to be transmitted into packets, that include destination and source addresses along with network control information and error detection hash values. Processors 804 can be any a combination of: processor, core, graphics processing unit (GPU), field programmable gate array (FPGA), application specific integrated circuit (ASIC), or other programmable hardware device that allow programming of network interface 800. For example, processors 804 can provide for identification of a resource to use to perform a workload and generation of a bitstream for execution on the selected resource. For example, a "smart network interface" can provide packet processing capabilities in the network interface using processors 804.

Packet allocator 824 can provide distribution of received packets for processing by multiple CPUs or cores using timeslot allocation described herein or RSS. When packet allocator 824 uses RSS, packet allocator 824 can calculate a hash or make another determination based on contents of a received packet to determine which CPU or core is to process a packet.

Interrupt coalesce 822 can perform interrupt moderation whereby network interface interrupt coalesce 822 waits for multiple packets to arrive, or for a time-out to expire, before generating an interrupt to host system to process received packet(s). Receive Segment Coalescing (RSC) can be performed by network interface 800 whereby portions of incoming packets are combined into segments of a packet. Network interface 800 provides this coalesced packet to an application.

Direct memory access (DMA) engine 852 can copy a packet header, packet payload, and/or descriptor directly from host memory to the network interface or vice versa, instead of copying the packet to an intermediate buffer at the host and then using another copy operation from the intermediate buffer to the destination buffer.

Memory 810 can be any type of volatile or non-volatile memory device and can store any queue or instructions used to program network interface 800. Transmit queue 806 can include data or references to data for transmission by network interface. Receive queue 808 can include data or references to data that was received by network interface from a network. Descriptor queues 820 can include descriptors that reference data or packets in transmit queue 806 or receive queue 808. Bus interface 812 can provide an interface with host device (not depicted). For example, bus interface 812 can be compatible with PCI, PCI Express, PCI-x, Serial ATA, and/or USB compatible interface (although other interconnection standards may be used).

Figure 9:
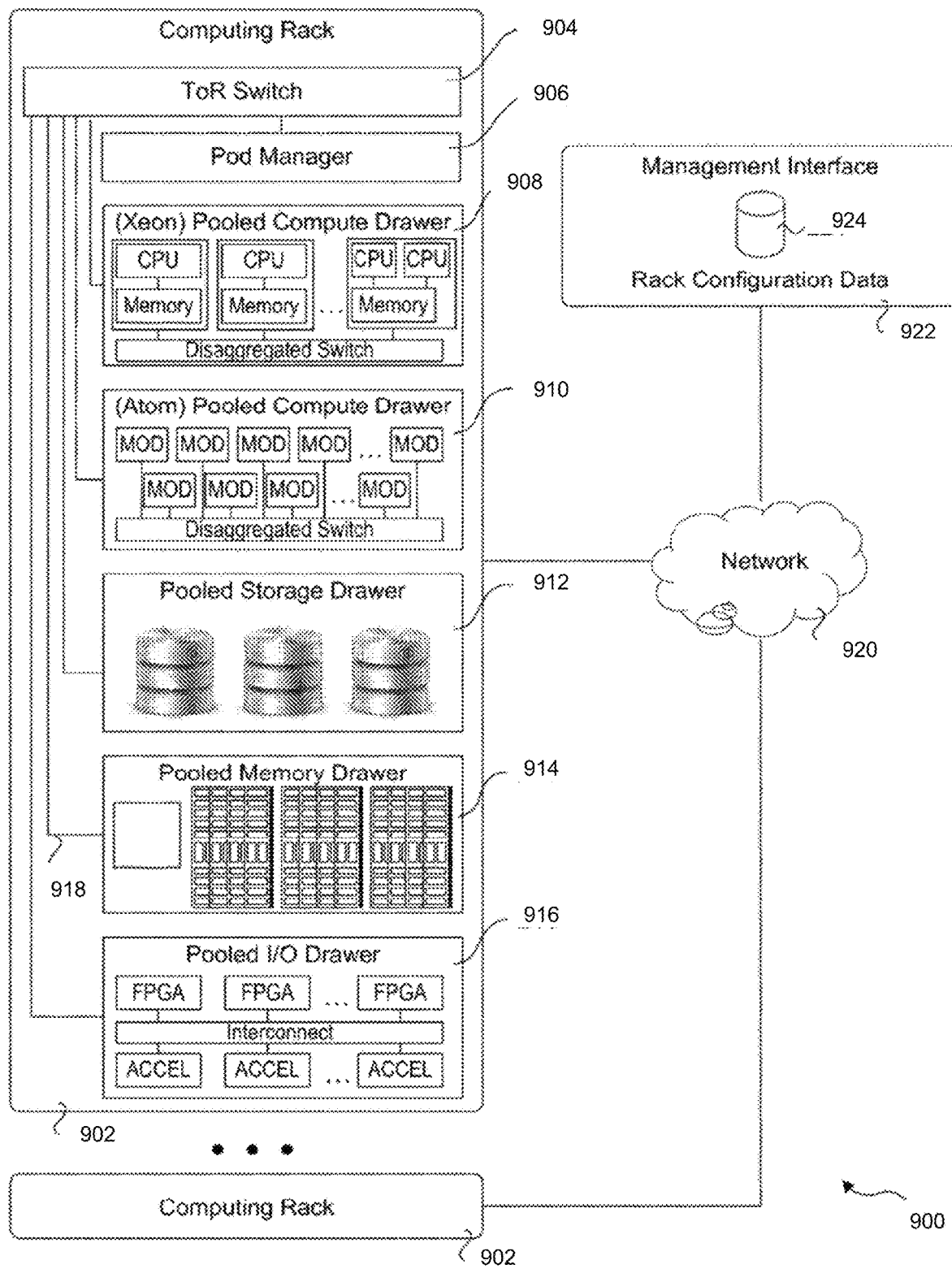
FIG. 9 depicts an example environment.

FIG. 9 depicts an environment 900 includes multiple computing racks 902, each including a Top of Rack (ToR) switch 904, a pod manager 906, and a plurality of pooled system drawers. Various embodiments can be used in a switch. Generally, the pooled system drawers may include pooled compute drawers and pooled storage drawers. Optionally, the pooled system drawers may also include pooled memory drawers and pooled Input/Output (I/O) drawers. In the illustrated embodiment the pooled system drawers include an Intel® XEON® pooled computer drawer 908, and Intel® ATOM™ pooled compute drawer 910, a pooled storage drawer 912, a pooled memory drawer 914, and a pooled I/O drawer 916. Each of the pooled system drawers is connected to ToR switch 904 via a high-speed link 918, such as a 40 Gigabit/second (Gb/s) or 100 Gb/s Ethernet link or a 100+ Gb/s Silicon Photonics (SiPh) optical link. In one embodiment high-speed link 918 comprises an 800 Gb/s SiPh optical link.

Multiple of the computing racks 902 may be interconnected via their ToR switches 904 (e.g., to a pod-level switch or data center switch), as illustrated by connections to a network 920. In some embodiments, groups of computing racks 902 are managed as separate pods via pod manager(s) 906. In one embodiment, a single pod manager is used to manage all of the racks in the pod. Alternatively, distributed pod managers may be used for pod management operations.

Environment 900 further includes a management interface 922 that is used to manage various aspects of the environment. This includes managing rack configuration, with corresponding parameters stored as rack configuration data 924.

Figure 10:
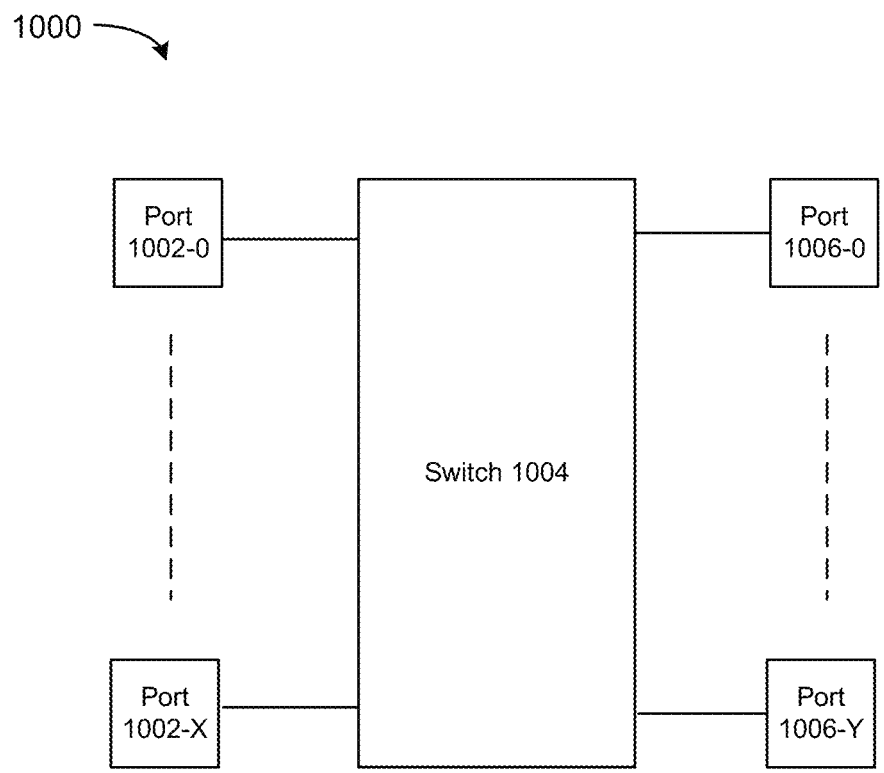
FIG. 10 depicts an example switch.

FIG. 10 depicts an example switch. Various embodiments can be used in or with the switch of FIG. 10 to provide management of non-heavy and heavy flows. Switch 1004 can route packets or frames of any format or in accordance with any specification from any port 1002-0 to 1002-X to any of ports 1006-0 to 1006-Y (or vice versa). Any of ports 1002-0 to 1002-X can be connected to a network of one or more interconnected devices. Similarly, any of ports 1006-0 to 1006-X can be connected to a network of one or more interconnected devices. Switch 1004 can decide which port to transfer packets or frames to using a table that maps packet characteristics with an associated output port. For example, match-action tables can be used whereby a hash of a portion of a packet is used as an index to find an entry. Various embodiments described herein can be used for key-value lookup operations. In addition, switch 1004 can perform packet replication for forwarding of a packet or frame to multiple ports and queuing of packets or frames prior to transfer to an output port. Some embodiments implement hash-lookup in P4 programing language, which is a programming language designed to allow programming of packet forwarding in data-planes. In contrast to general purpose language such as C or python, P4 is domain-specific language with a number of constructs optimized around network data forwarding.

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. It is noted that hardware, firmware and/or software elements may be collectively or individually referred to herein as "module," "logic," "circuit," or "circuitry." A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, scripted language, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An embodiment of the devices, systems, and methods may include any one or more, and any combination of, the examples described below.

Example 1 includes an apparatus for key-value lookup comprising: a first memory to store a first hash table that comprises entries associated with a first hash calculation on a received key, wherein an entry includes a key and the first memory is to provide the entry based on a match of an associated key with the received key, wherein a first index is based on a first hash function and a received key and a processor to retrieve a collision hint to identify any other hash table to search and to cause search of any other hash table in parallel for a match of a hash of the key.

Example 2 includes any example, wherein a key-value lookup occurs in a determinate time frame.

Example 3 includes any example, and includes a hint content addressable memory (CAM) to store the collision hints wherein collision hints identify zero or more other hash tables that are to be searched.

Example 4 includes any example, wherein the first memory is to store collision hints wherein the collision hints identify zero or more other hash tables that are to be searched.

Example 5 includes any example, and includes a second hash function calculator to calculate a second index based on a second hash function and the received key based on a collision hint identifying another hash table to search and a second memory to store a second hash table and to provide an entry that includes an index that matches the second index.

Example 6 includes any example, wherein the second hash function calculation is to produce a different index than that of the first hash calculation on the received key.

Example 7 includes any example, and includes a hint content addressable memory (CAM) to store the collision hints wherein collision hints identify zero or more other hash tables that are to be searched, wherein the search for entries in the first hash table for a match of the key and the search of any other hash table for a match of the received key occurs within a single memory read cycle.

Example 8 includes any example, wherein the first memory is to store the collision hints, wherein collision hints identify zero or more other hash tables that are to be searched and wherein the search for entries in the first hash table for a match of the key and the search of any other hash table for a match of the received key occur within a duration of two memory read cycles.

Example 9 includes any example, and includes one or more of: a network interface controller, server, rack, or data center.

Example 10 includes any example, and includes a network interface controller to use key-value lookup to determine a packet processing action on a packet.

Example 11 includes a method comprising: accessing a collision hint table to identify any other hash tables aside from a default table to search, wherein an entry in a table includes a key-value pair and a table is to provide the entry based on a match of an associated key with a received key; calculating an index using a hash function and the received key based on the collision hint table identifying another hash table to search; and providing a value from an entry from the another hash table based on a match of the received key with a key in the entry from the another hash table.

Example 12 includes any example, and includes accessing a content addressable memory (CAM) to access the collision hint table.

Example 13 includes any example, wherein a default hash table is to store the collision hint table.

Example 14 includes any example, and includes: calculating an index based on a hash calculation and the received key based on a collision hint identifying another hash table to search and accessing a hash table identified by the collision hint and providing an entry that includes an index that matches the calculated index.

Example 15 includes any example, and includes: searching a default hash table for a match of the received key, wherein searching for entries in the default hash table for the match of the key and searching of any other hash table for a match of the received key occurs within a single memory read cycle.

Example 16 includes any example, and includes: searching a default hash table for a match of the received key, wherein searching for entries in the default hash table for the match of the key and searching of any other hash table for a match of the received key occurs within a single memory read cycle.

Example 17 includes any example, wherein hash calculations performed for different tables using the received key produce different indexes.

Example 18 includes a network interface comprising: a first memory to store a first hash table comprising entries associated with a first hash calculation on a received key and to store a collision hint to identify any other hash table to search, wherein an entry includes a key-value pair and the first memory is to provide the value based on a match of the received key with the key of the key-value pair and a set of hash function calculators to calculate a set of indexes based on a set of hash functions and the received key based on a collision hint identifying at least one other hash table to search, the hash functions to yield different indexes for the received key.

Example 19 includes any example, and includes a content addressable memory (CAM) to store collision hints, wherein collision hints identify zero or more other hash tables that are to be searched for the received key.

Example 20 includes any example, wherein the first memory is to store collision hints, wherein collision hints identify zero or more other hash tables that are to be searched for the received key.

What is claimed is:

1. An apparatus for key-value lookup comprising:
  a first memory to store a first hash table that comprises entries associated with a first hash function calculation on a received key, wherein an entry of the entries includes a key and the first memory is to provide a value in the entry based on a match of the key of the entry with the received key, wherein a first index is associated with the entry and is based on first hash function and a received key and
  a processor to search a number of hash tables for parallel lookup of hash collisions for a match of a hash of the received key by:
    based on an indication to search one hash table:
      perform a second hash function calculation on the received key,
      calculate a second index based on the second hash function calculation and the received key, and
      provide a second value in a second entry associated with the second index based on a match of a key of the second entry with the received key; and
    based on an indication to search two hash tables, perform operations (a) and (b), at least partially, in parallel:
      (a) perform the second hash function calculation on the received key, calculate the second index based on the second hash function calculation and the received key, and provide the second value in the second entry associated with the second index based on the match of the key of the second entry with the received key; and
      (b) perform a third hash function calculation on the received key, calculate a third index based on a third hash function calculation and the received key, and provide a third value in a third entry associated with the third index based on a match of a key of the third entry with the received key.

2. The apparatus of claim 1, wherein a key-value lookup occurs in a determinate time frame.

3. The apparatus of claim 1, comprising a content addressable memory (CAM) to store the indication to identify zero or more other hash tables that are to be searched.

4. The apparatus of claim 1, wherein the first memory is to store the indication to identify zero or more other hash tables that are to be searched.

5. The apparatus of claim 1, wherein the second hash function calculation is to produce a different index based on the received key than that of the first hash function calculation on the received key.

6. The apparatus of claim 1, comprising a content addressable memory (CAM) to store the indication to identify zero or more other hash tables that are to be searched, wherein the search for entries in the first hash table for a match of the key and the search of another hash table for a match of the received key occurs within a single memory read cycle.

7. The apparatus of claim 1, wherein the first memory is to store indicators, wherein the indication identify zero or more other hash tables that are to be searched and wherein the search for entries in the first hash table for the match of the key and the search of another hash table for the match of the received key occur within a duration of two memory read cycles.

8. The apparatus of claim 1, comprising one or more of: a network interface controller, server, rack, or data center.

9. The apparatus of claim 1, comprising a network interface controller to use key-value lookup to determine a packet processing action on a packet.

10. The apparatus of claim 1, wherein the processor is to:
  based on an indication to search three hash tables, perform operations (a), (b), and (c), at least partially, in parallel:
    (a) perform the second hash function calculation on the received key, calculate the second index based on the second hash function calculation and the received key, and provide the second value in the second entry associated with the second index based on the match of the key of the second entry with the received key;
    (b) perform the third hash function calculation on the received key, calculate the third index based on the third hash function calculation and the received key, and provide the third value in the third entry associated with the third index based on a match of the key of the third entry with the received key; and
    (c) perform a fourth hash function calculation on the received key, calculate a fourth index based on a fourth hash function calculation and the received key, and provide a fourth value in a fourth entry associated with the fourth index based on a match of a key of the fourth entry with the received key.

* * * * *